United States Patent [19]

McVicker et al.

[11] 4,275,046

[45] Jun. 23, 1981

[54] PREPARATION OF HIGH SURFACE AREA METAL FLUORIDES AND METAL OXYFLUORIDES, ESPECIALLY ALUMINUM FLUORIDE EXTRUDATES

[75] Inventors: Gary B. McVicker, Westfield; Joseph J. Eggert, Rahway, both of N.J.

[73] Assignee: Exxon Research & Engineering Co., Florham Park, N.J.

[21] Appl. No.: 869,776

[22] Filed: Jan. 16, 1978

[51] Int. Cl.³ ............................................. C01G 43/06
[52] U.S. Cl. ....................................... 423/258; 252/1; 252/301.1 R; 252/441; 423/491; 423/492; 423/493; 423/494; 423/495; 423/496; 423/497; 423/499
[58] Field of Search ............... 423/491, 492, 493, 494, 423/495, 496, 497, 499, 258, 259, 3, 22, 46, 49, 53, 62, 69, 87, 89, 99, 138, 179, 155, 111, 21; 252/1, 301.1 R, 441

[56] References Cited

U.S. PATENT DOCUMENTS

| | | | |
|---|---|---|---|
| 1,314,571 | 9/1919 | Chase | 423/491 X |
| 2,899,269 | 8/1959 | Katz | 423/492 |
| 2,972,513 | 2/1961 | Mogard et al. | 423/259 X |
| 3,130,168 | 4/1964 | Hov | 423/492 X |
| 3,235,618 | 2/1966 | Hoppel | 260/673 |
| 3,305,300 | 2/1967 | McBrayer | 423/492 X |
| 3,494,729 | 2/1970 | Lerner et al. | 423/492 |
| 3,717,586 | 2/1973 | Suggitt et al. | 252/439 |
| 3,821,356 | 6/1974 | Baldwin | 423/491 X |
| 3,956,147 | 5/1976 | Becker et al. | 423/258 X |
| 4,034,070 | 7/1977 | Wojtowicz et al. | 423/258 X |
| 4,128,589 | 12/1978 | Pastor et al. | 423/491 X |

FOREIGN PATENT DOCUMENTS

| | | | |
|---|---|---|---|
| 936331 | 11/1973 | Canada | 423/492 |
| 2424852 | 12/1974 | Fed. Rep. of Germany . | |
| 897187 | 2/1962 | United Kingdom | 423/492 |
| 969863 | 9/1964 | United Kingdom . | |
| 995186 | 6/1965 | United Kingdom . | |
| 1135838 | 4/1968 | United Kingdom | 423/258 |
| 416317 | 6/1974 | U.S.S.R. | 423/492 |

OTHER PUBLICATIONS

Chem. Abs., 86: 130509; 1977.
Pascal, P. (Ed)., *Nouveau Traite de Chimie Minérale*, vol. 15, pp. 22–23.
Reitsma, H. J. et al., *J. Catalysis*, 33: 39–46, 1974.
Pausewang, V. G. et al., *Z. Anorg. u. Allgem.*, Chem. 39: 89–104, 1969.

*Primary Examiner*—Richard E. Schafer
*Attorney, Agent, or Firm*—Joseph J. Allocca; Edward M. Corcoran

[57] ABSTRACT

A method is described for the preparation of high surface area metal fluorides and metal oxyfluorides comprising reacting high surface area metal oxides with a fluorocarbon vapor wherein the fluorocarbon is selected from the group consisting of $CH_{4-Q}F_Q$ wherein Q is 1 to 3 and totally or partially fluorinated $C_2$–$C_6$ alkanes, alkenes and alkynes and $C_5$–$C_6$ cyclic alkanes, preferably fluoroform ($CHF_3$) wherein the metal oxides and the fluorocarbon vapors are contacted at a temperature of from about 300° to about 800° C., for a time sufficient to effect the essentially complete conversion of the metal oxides into metal fluorides or the partial conversion of the metal oxides into metal oxyfluorides. The metal oxides converted into metal fluorides may be selected from the group consisting of the oxides of sodium, potassium, lithium, cesium, magnesium, calcium, barium, strontium, tin, antimony, bismuth, titanium, zirconium, vanadium, chromium, manganese, iron, cobalt, rhodium, mercury, nickel, copper, silver, zinc, cadmium, lead, uranium, europium, idium, lutetium, neodymium, thallium and mixtures thereof. The metal oxides converted into metal oxyfluorides may be selected from the group recited above and further include silicon, niobium, hafnium, tantalum, molybdenum, tungsten, technetium, rhenium, osmium, iridium, lanthanum and ruthenium. The above metal oxides may also be utilized in combination with alumina and silica. The fluorocarbon partial pressure in the treatment vapor may be in the range of from about 0.001 to about 100 atmosphere. By the practice of the instant invention high surface area metal fluoride extrudates are prepared by the conversion of metal oxide extrudate, particularly aluminum fluoride extrudates from alumina extrudates.

25 Claims, 1 Drawing Figure

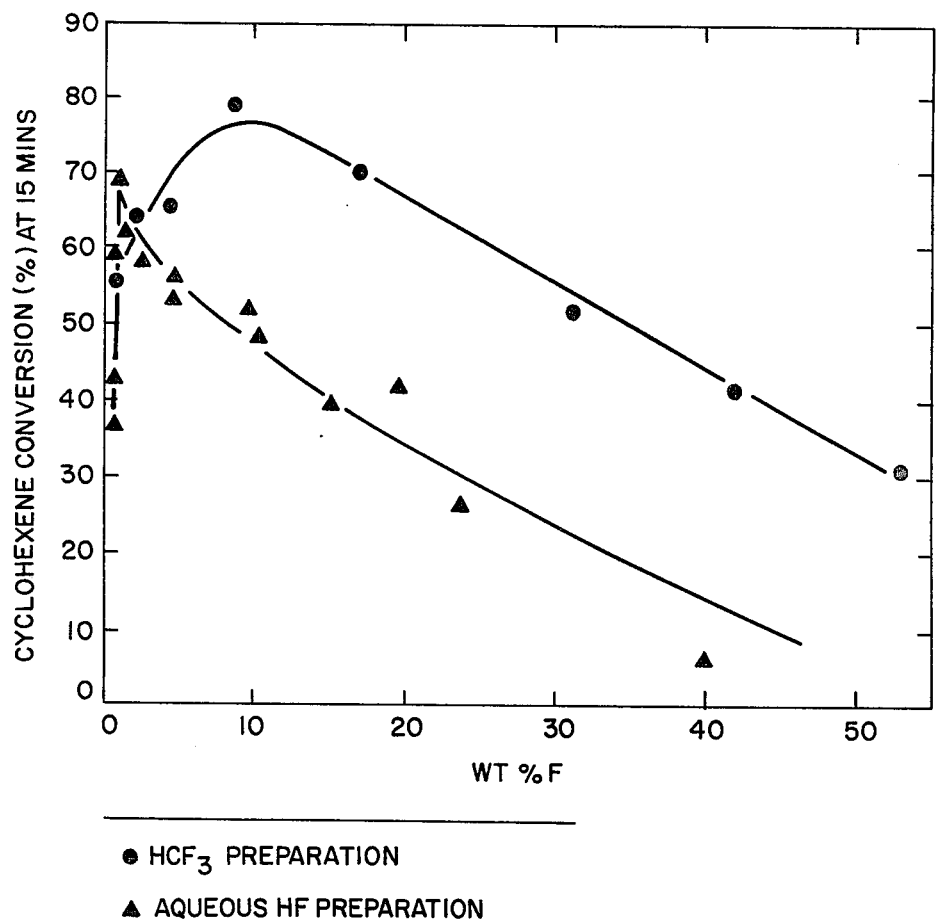
FIGURE I
CYCLOHEXENE ISOMERIZATION OVER FLUORINATED ALUMINAS
350°C, 200 psig $H_2$/CYCLOHEXENE = 2.3
S.V. = 25
● $HCF_3$ PREPARATION
▲ AQUEOUS HF PREPARATION

PREPARATION OF HIGH SURFACE AREA METAL FLUORIDES AND METAL OXYFLUORIDES, ESPECIALLY ALUMINUM FLUORIDE EXTRUDATES

DESCRIPTION OF THE INVENTION

A process is described for the preparation of high surface area metal fluorides comprising reacting high surface area metal oxides selected from the group consisting of the oxides of magnesium, sodium, potassium, lithium, cesium, calcium, barium, strontium, tin, antimony, bismuth, titanium, zirconium, vanadium, chromium, manganese, iron, cobalt, rhodium, mercury, nickel, copper, silver, zinc, lead, cadmium, uranium, europium, indium, lutetium, neodymium, thallium and mixtures thereof, preferably titanium, magnesium, uranium, nickel, cobalt and zirconium, more preferably titanium, magnesium and uranium, most preferably titanium with a fluorocarbon vapor wherein the fluorocarbon is selected from the group consisting of $CH_{4-Q}F_Q$ wherein Q is 1-3 and totally or partially fluorinated $C_2$—$C_6$ alkanes, alkenes and alkynes and $C_5$-$C_6$ cyclic alkanes, preferably fluoroform and straight and branch chain $C_2$-$C_6$ fluorocarbons of the general formula:

$$C_A H_{2A+2-B} F_B$$

wherein A is an integer ranging from 2 to 6 inclusive, preferably 2 to 3, and B is an integer ranging from 1 to 14 and cyclic fluorocarbons of the formula:

$$C_X H_{2X-C} F_C$$

wherein X is 5 or 6 and C is an integer ranging from 1 to 12, most preferably fluoroform ($CHF_3$) wherein the metal oxides and the fluorocarbons are contacted at a temperature of from about 300° to about 800° C., preferably about 300° to about 600° C., most preferably about 350° to about 550° C., at a fluorocarbon partial pressure of from about 0.001 to about 100 atmosphere, preferably about 0.01 to about 10 atmospheres, most preferably about 0.1 to about 1 atmosphere, for a time sufficient to effect the desired level of conversion of the metal oxide into metal fluoride. Alternatively, the metal oxide recited above may be used in combination with alumina or silica to give, for example, metal fluoride-aluminum fluoride mixtures. An inert diluent gas such as hydrogen, helium, nitrogen or argon can be used. When liquid fluorocarbons are used as the source of fluorine, the inert gas may be bubbled through the fluorocabon liquid resulting in the formation of a fluorocarbon vapor-inert gas mixture which is contacted with the subject metal oxide.

Materials exhibiting the essential complete conversion of the metal oxide into metal fluorides can be obtained by the practice of the instant invention. It is also possible to obtain materials exhibiting lower levels of conversion when such are desired. Such metal oxyfluorides are prepared from the metal oxides recited above and further include the oxides of silicon, niobium, hafnium, tantalum, molybdenum, tungsten, technetium, rhenium, osmium, iridium, lanthanum and ruthenium.

It has also been discovered that by the practice of the instant invention materials such as $AlF_3$ extrudates having high surface area and high purity are fabricated from $Al_2O_3$ extrudates. The $AlF_3$ extrudates unexpectedly retain the configuration, dimensions, and strength of the $Al_2O_3$ extrudate starting material. $AlF_3$ prepared by prior art methods and available commercially is a fine powder which cannot be extruded or pelletized and consequently cannot be used in commercial catalytic units requiring such configurations and structural strength. Commercially available $AlF_3$ is also characterized by very low BET surface areas, normally less than about 5 m²/gm. By way of contrast, the $AlF_3$ extrudates prepared by the instant process possesses surface area ranging from 10 to 50 m²/gm. The instant invention prepared $AlF_3$ extrudates are obtained in very high purity (greater than 95%). The $AlF_3$ extrudates and the other metal fluorides and mixed metal fluorides prepared by the process of the instant invention can be used in solid acid catalyzed hydrocarbon conversion processes with or without the presence of an added metal component. The high surface area $AlF_3$ in extrudate form (by conversion of $Al_2O_3$ extrudates) and other metal fluorides prepared by the conversion of the corresponding metal oxide or mixed metal oxide can be used as a support for a variety of added metals (Groups V, VI, VII, VIII and IB) and would have application in numerous catalytic hydrocarbon conversion processes.

BACKGROUND OF THE INVENTION

As an article of commerce anhydrous $AlF_3$ is a white crystalline solid which sublimes at 1290° C./760 mm. It is most conveniently prepared by fluoriding $Al_2O_3$ with gaseous or aqueous HF (1)

$$Al_2O_3 + 6HF \rightarrow 2AlF_3 + 3H_2O \quad (1)$$

or by allowing an aluminum hydrate to react with ammonium bifluoride (2)

$$Al(OH)_3 + 3NH_4HF_2 \rightarrow AlF_3 + 3NH_4F + 3H_2O \quad (2)$$

in solution or in the solid state. The reactions summarized in equations 1 and 2 are normally conducted at temperatures of about 600° C. and higher. The anhydrous $AlF_3$ thus produced is typically in the form of a very fine powder. Detailed discussions of the common commercial methods of $AlF_3$ preparation may be found in either *Kirk-Othner Encyclopedia of Chemical Technology*, Second Edition, Vol. 9, Wiley, New York, pgs. 527-547; or G. N. Kannan, *Indian Chem. J.* 4, 22, 1969. Commercially available $AlF_3$ ranges from 60-90% $AlF_3$, the major impurities being $H_2O$, $Al_2O_3$ and mixed aluminum hydroxyfluorides. Commercially available $AlF_3$ is of limited value in catalytic operations since the fine powder cannot be satisfactorily compacted or extruded into self-supporting pellets. Also in many catalytic applications unreacted $Al_2O_3$ cannot be tolerated.

THE INVENTION

High surface area metal fluorides of the formula $MF_y$ wherein M is a metal selected from the group consisting of magnesium, sodium, potassium, lithium, cesium, calcium, barium, strontium, tin, antimony, bismuth, titanium, zirconium, vanadium, chromium, manganese, iron, cobalt, rhodium, mercury, nickel, copper, silver, zinc, cadmium, lead, uranium, europium, indium, lutetium, neodymium, thallium and mixtures thereof, preferably, titanium, magnesium, uranium, nickel, cobalt and zirconium most preferably titanium, magnesium and uranium and y is a number satisfying the valence requirements of the metal, are prepared by reacting a metal oxide selected from the group consisting of the oxides of the metals recited above with a fluorocarbon vapor wherein the fluorocarbon is selected from the group consisting of $CH_{4-Q}F_Q$ wherein Q is 1-3 and totally and partially fluorinated $C_2$-$C_6$ alkanes, alkenes and alkynes and $C_5$-$C_6$ cyclic alkanes, preferably fluoroform and straight and branch chain, $C_2$-$C_6$ fluorocarbons of the general formula:

$$C_AH_{2A+2-B}F_B$$

wherein A is an integer ranging from 2 to 6 inclusive, preferably 2 to 3, and B is an integer ranging from 1 to 14 inclusive and cyclic fluorocarbons of the formula:

$$C_XH_{2X-C}F_C$$

wherein X is 5 or 6 and C is 1 to 12, most preferably fluoroform wherein the metal oxides and the fluorocarbon vapor are contacted at a temperature of from about 300° to about 800° C., preferably from about 300° to about 600° C., most preferably from about 350° to 550° C. for a time sufficient to effect the essentially complete conversion of the metal oxide into metal fluoride. Metal oxyfluorides of the formula $MO_zF_{z-y}$ wherein M is a metal selected from the group enumerated above and further including silicon, niobium, tantalum, molybdenum, tungsten, technetium, ruthenium, iridium, hafnium, rhenium, osmium and lanthanum, preferably titanium, magnesium, uranium, tantalum, tungsten, nickel, cobalt and molybdenum, most preferably titanium, magnesium, uranium and tungsten, z is a number satisfying the valence requirements of the metal and y is a number satisfying the valence requirements of the metal are prepared as described above, the contacting of the selected metal oxide with a fluorocarbon source as recited above being conducted at a temperature as stated above for a time sufficient to effect the partial conversion of the metal oxide into the metal oxyfluoride. Alternatively, the enumerated metal oxides may be mixed with added alumina or silica yielding for example, a metal fluoride-aluminum fluoride or metal oxyfluoride-aluminum oxyfluoride-mixture. The fluorocarbon vapor partial pressure may be in the range of from about 0.001 to about 100 atmospheres, preferably about 0.01 to about 10 atmospheres, most preferably about 0.1 to about 1 atmospheres.

In one embodiment of the instant invention, high surface area $AlF_3$ extrudates are prepared by contacting high surface area $Al_2O_3$ extrudates with a fluorocarbon vapor wherein the fluorocarbon is selected from the group consisting of $CH_{4-Q}F_Q$ wherein Q is 1-3 and fully and partially fluorinated $C_2$-$C_6$ alkanes, alkenes and alkynes and $C_5$-$C_6$ alkanes, preferably fluoroform and straight or branch chain fluorocarbons of the formula:

$$C_AH_{2A+2-B}F_B$$

wherein A is an integer ranging from 2 to 6 inclusive, preferably 2 to 3, and B is an integer ranging from 1 to 14 inclusive and cyclic fluorocarbons of the formula:

$$C_XH_{2X-C}F_C$$

wherein X is 5 or 6 and C is 1 to 12, most preferably fluoroform ($CHF_3$), wherein the $Al_2O_3$ extrudate and the fluorocarbons are contacted at a temperature of from about 300° to about 800° C., preferably about 300° to about 600° C., most preferably about 350° to about 550° C., at a fluorocarbon partial pressure of from 0.001 to 100 atmosphere, preferably 0.01 to 10 atmosphere, most preferably 0.1 to 1.0 atmosphere for a time sufficient to effect the essentially complete conversion of the $Al_2O_3$ into $AlF_3$. A diluent such as hydrogen He, $N_2$ or Ar can be used. When a liquid fluorocarbon is used as the source of fluorine, the inert gas is bubbled through the fluorocarbon liquid resulting in formation of a fluorocarbon vapor-inert gas mixture which is contacted with the alumina extrudate. Essentially, 100% $AlF_3$ extrudates are useful and unique as supports for catalytically active metals, for example, as supports for platinum and palladium. The specific benzene hydrogenation activaties of $Pt/AlF_3$ and $Pd/AlF_3$ catalysts have been found to be comparable to those exhibited by the metals supported on $Al_2O_3$ or $SiO_2$.

EXPERIMENTS

Materials

An 1/6 inch $\gamma$-$Al_2O_3$ extrudate with a BET surface area of 178 was employed. Trifluoromethane ($HCF_3$) and tetrafluoromethane ($CF_4$) were used as supplied by the Matheson Gas Company. Hydrogen (Linde) was passed through a Deoxo unit and a molecular sieve drier prior to use. Helium (Bureau of Mines) was dried by passage through a molecular sieve drier. Aluminum fluoride samples were obtained from commercial sources.

Preparation of Aluminum Fluoride

The fluoridation of $\gamma$-$Al_2O_3$ with $HCF_3$ takes place readily at temperatures above 350. The non-toxic and non-corrosive nature of $HCF_3$ makes this fluoriding technique very attractive from the point of view of convenience and safety. The formation of $AlF_3$ (rhomohedral form) from $\gamma$-$Al_2O_3$ is consistent with equation (3).

$$\gamma\text{-}Al_2O_3 + 2HCF_3 \rightarrow 2AlF_3 + 2CO + H_2O \quad (3)$$

The free energy of formation of $AlF_3$ according to equation (3) is favorable by 111 kcal/mole. The reaction goes essentially to completion and is not greatly retarded at increasing conversion levels. $HCF_3$ utilization at temperatures above 450° C. is very nearly stoichiometric. The nearly stoichiometric fluoridation of $\gamma$-$Al_2O_3$ with $HCF_3$ at 450°-500° C. and at $CHF_3$ partial pressures of 0.33 atm. to 0.11 atm is clearly illustrated in Table I.

TABLE I

| | FLUORIDATION OF $\delta$-$Al_2O_3$ WITH $HCF_3^{(a)}$ | | | | | |
|---|---|---|---|---|---|---|
| No. | $HCF_3^{(b)}$ (cc/min) | T°C. Starting | Time (Hr) $\delta$-$Al_2O_3$ | Wt. Gm (Theoretical) | Wt. Gm (Found) | % $AlF_3$ (Theoretical) | $BET^{(c)}$ ($m^2$/gm) |
| 1 | | | | | | | 178 |
| 2 | 25 | 497 | 0.125 | 20.3 | 20.3 | 3.46 | 175 |

TABLE I-continued
FLUORIDATION OF δ-Al₂O₃ WITH HCF₃[a]

| No. | HCF₃[b] (cc/min) | T°C. Starting | Time (Hr) δ-Al₂O₃ | Wt. Gm (Theoretical) | Wt. Gm (Found) | % AlF₃ (Theoretical) | BET[c] (m²/gm) |
|---|---|---|---|---|---|---|---|
| 3  | 25  | 499 | 0.25 | 20.5 | 20.5 | 6.86 | 171 |
| 4  | 50  | 503 | 0.25 | 21.1 | 20.9 | 13.3 | 165 |
| 5  | 50  | 498 | 0.50 | 22.2 | 21.6 | 25.4 | 146 |
| 6  | 50  | 450 | 0.50 | 22.2 | 22.1 | 25.4 | 144 |
| 7  | 50  | 504 | 0.75 | 22.8 | 22.8 | 36.2 | 135 |
| 8  | 50  | 504 | 1.00 | 24.4 | 24.3 | 46.1 | 96 |
| 9  | 50  | 501 | 1.50 | 26.6 | 26.2 | 63.5 | 79 |
| 10 | 50  | 501 | 2.00 | 28.8 | 27.9 | 78.2 | 47 |
| 11 | 50  | 501 | 3.00 | 32.9 | 31.7 | 100 | 8.7 |
| 12 | 100 | 504 | 1.50 | 32.9 | 31.6 | 100 | 8.9 |

[a]20.0 gm of dry δ-Al₂O₃ extrudate was employed in each fluoridation experiment. The δ-Al₂O₃ extrudates were pre-reduced (20% H₂/He, 500 cc/min) at 500° C. prior to fluoridation.
[b]200 cc/min of helium was employed as diluent in each fluoridation experiment. 1.0 atm total pressure
[c]surface areas were determined by the nitrogen BET method.

To further illustrate the method of the instant invention consider the following general procedure.

In a typical quartz tube furnace preparation of AlF₃ 100 gm of γ-Al₂O₃ extrudate was allowed to react with 40% HCF₃/He (500 cc/min, 1.0 atm) at 500° C. for 5.0 hours. A yield of 158 gm (165 gm theoretical yield) of AlF₃ extrudate was obtained. The progress of the reaction was conveniently monitored by visually following the evolution of H₂O vapor. Completion of the reaction was signalled by an abrupt cessation of H₂O vapor. No equipment corrosion problems were encountered. Caution should be exercised, however, as the exit gases may contain small quantities of HF or fluorine. The HCF₃ treatment gas is non-toxic.

Tetrafluoromethane (CF₄) was found to be ineffective in bulk fluoriding Al₂O₃ at temperatures as high as 600° C. Even in the presence of metals and/or oxygen no bulk fluoridation of Al₂O₃ occurred at 600° C. using CF₄. Thus, when using fluoromethanes at least one reactive hydrogen must be initially present in the molecule.

The preferred fluorocarbons for the fluorination of Al₂O₃ extrudates, are selected from the group consisting of $CH_{4-Q}F_Q$ wherein Q is 1–3 and straight and branch chain fluorocarbons having the general formula

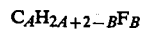
$$C_A H_{2A+2-B} F_B$$

wherein A is an integer ranging from 2 to 6 inclusive and B is an integer ranging from 1 to 14 cyclic fluorocarbons of the formula

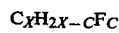
$$C_X H_{2X-C} F_C$$

wherein X is 5 or 6 and C is 1 to 12. The most preferred fluorocarbon, however, is HCF₃.

A typical HCF₃ is prepared AlF₃ sample (22.4 m²/gm) was subjected to a TGA study in an attempt to determine the exact extent of fluoridation. A 95.1 mg sample was found to lose 89.4 mg between 1000°–1200° under a helium purge (40 cc/min, 1.0 atm). The weight loss was due to the sublimation of AlF₃. The nonsublimable material was determined from an x-ray powder diffraction pattern to be α-Al₂O₃. From the weight of the recovered α-Al₂O₃ the concentration of AlF₃ in a typical HCF₃ prepared AlF₃ is near 95%. The high purity of the CHF₃ prepared AlF₃ is in contract to commercially available aluminum fluorides which assay between 60–90% AlF₃. The major impurities present in commercial AlF₃ are H₂O, Al₂O₃ and mixed hydroxyfluorides. Such materials are not desired in numerous catalytic applications.

PHYSICAL AND CHEMICAL PROPERTIES OF ALUMINUM FLUORIDE

Physical Form of CHF₃ prepared AlF₃

Unexpectedly the fluoridation of an extruded γ-Al₂O₃ with HCF₃ yield AlF₃ in the form of an extrudate. The crush strength of the AlF₃ extrudate was found to be comparable with that of starting γ-Al₂O₃ extrudates. This result is very significant since AlF₃ powders cannot be compacted or extruded into self-supporting pellets without the addition of a binder. The addition of binders is to be avoided in numerous catalytic applications of AlF₃.

The γ-Al₂O₃ extrudates have average dimensions of 0.073"×0.4" (nominally 1/16" extrudate). Since the AlF₃ products were found to have average dimensions of 0.071"×0.4" no change in superficial extrudate volume occurred during fluoridation. This is surprising because the crystal density of AlF₃ is less than that of γ-Al₂O₃, 3.2 and 3.7 gm/cc, respectively, and also because twice as many fluoride ions as oxide ions are required to complete the AlF₃ crystal lattice. The retention of the γ-Al₂O₃ extrudate volume upon fluoridation can be accounted for by the following. The relationship between superficial extrudate, crystal and pore volumes is given by equation (4).

$$\text{superficial extrudate volume} = \text{crystal volume} + \text{pore volume} \quad (4)$$

The crystal volume is calculated from the weight of a given extrudate particle and the known crystal density of the extrudate material. An apparent pore volume is then obtained in a straight forward calculation. The average pore volume of a γ-Al₂O₃ (178 m²/gm) was calculated to be 0.64±0.04 cc/gm. This value is in reasonable agreement with the H₂O wettability (0.65 cc/gm) and N₂ isotherm pore volume (0.51 cc/gm) of this particular γ-Al₂O₃. The average pore volume of a series of HCF₃ prepared AlF₃ extrudates (3.74 to 49.7 m²/gm) was calculated to be 0.29±0.03 cc/gm. The calculated pore volume agrees very well with the H₂O wettability (0.3 cc/gm) exhibited by these AlF₃ extrudates. Thus the apparent pore volume of γ-Al₂O₃ is reduced to about 50% of its original value upon fluoridation. The loss in pore volume results from fluoride ions occupying voids in the Al₂O₃ crystal lattice. Since the crystal volume occupied by fluoride ions is set by the conversion level, the above analysis indicates that the pore volume of AlF$_3$ can be systematically varied by utilizing aluminas with different starting pore volumes.

Surface Area

The effect of various reaction conditions on the surface area (nitrogen BET) of HCF$_3$ prepared AlF$_3$ is summarized in Tables IIA and IIB. The surface area of AlF$_3$ was found to decrease substantially upon increasing the fluoriding temperature from 400° to 500° C. while maintaining the space velocity of the treatment gas constant (Table IIA). Longer reaction times and/or higher concentrations of HCF$_3$ at a given temperature also produced lower surface area AlF$_3$. The drop in surface area appears to parallel increasing AlF$_3$ content (Table IIB). This effect is also clearly demonstrated by the data in Table I.

cially apparent in the intermediate (25–75%) AlF$_3$ content range. (See Tables I and IIB).

A commercial AlF$_3$ powder assayed as 61% AlF$_3$. The bulk of the remaining material is H$_2$O. The commercial sample reported in Table IIA (3.25 m$^2$/gm) was calcined at 650° C. for 5.0 hours under 20% O$_2$/He (500 cc/min) prior to the standard BET surface area measurement. The calcined sample was shown by an x-ray diffraction measurement to be essentially rhombohedral AlF$_3$. Calcining the commercial AlF$_3$·xH$_2$O product at 550° C. for 5.0 hours yielded a rhombohedral AlF$_3$ which was badly contaminated with an AlF$_{1.96}$(OH)$_{1.04}$ phase. The presence of unreacted Al$_2$O$_3$ is undesirable in many catalytic applications of AlF$_3$.

The HCF$_3$ prepared AlF$_3$ products listed in Table IIA were all found to exhibit an x-ray powder diffraction pattern consistent with that reported for rhombohedral AlF$_3$. The major diffraction lines of rhombohedral AlF$_3$ are summarized in Table III. Only the highest surface area AlF$_3$ (49.7 m$^2$/gm) product exhibited discernible weak background diffraction lines from unreacted Al$_2$O$_3$. Addition of incremental amounts of $\gamma$-Al$_2$O$_3$ to a high purity AlF$_3$ has set the minimum x-ray detectable Al$_2$O$_3$ in AlF$_3$ concentration to be between 5 and 10 wt. %. The minimum AlF$_3$ content of the HCF$_3$ prepared samples summarized in Table IIA is estimated from x-ray data to be at least 90 wt. %.

Additional AlF$_3$ surface area data abstracted from the literature is presented in Tables IIA and IIB for comparative purposes. Within the 90% and higher AlF$_3$ concentration range the HCF$_3$ prepared samples exhibit higher surface areas than those prepared by fluoriding Al$_2$O$_3$ with either aqueous or gaseous HF or NH$_4$F.

TABLE IIA

THE EFFECT OF REACTION CONDITIONS ON THE SURFACE AREA AND PORE VOLUME OF AlF$_3$ PREPARED BY FLUORIDING $\gamma$-Al$_2$O$_3$ WITH HCF$_3$

| T° C. | %HCF$_3$He[a] | t (Hr) | Minimum (%) AlF$_3$ | Surface Area[b] (m$^2$/gm) | Pore Volume (b) (cc/gm) |
|---|---|---|---|---|---|
| Starting $\gamma$-Al$_2$O$_3$[c] | | | | 178 | 0.513 |
| 350 | 33 | 1.0 | | No Apparent Reaction | |
| 400 | 20 | 3.0 | 90[d] | 49.7 | 0.232 |
| 450 | 20 | 2.0 | 90[d] | 32.9 | 0.198 |
| 450 | 20 | 2.5 | 95[e] | 22.4 | 0.171 |
| 500 | 20 | 2.5 | 95[d] | 25.4 | 0.135 |
| 500 | 20 | 2.5 | 95[d] | 21.5 | 0.177 |
| 500 | 40 | 5.0 | 99[e] | 3.74 | 0.050 |
| Aqueous HF Treated Al$_2$O$_3$ | | | ~100[f] | 11.8 | |
| Aqueous HF Treated Al$_2$O$_3$ | | | ~100[f] | 6.9 | |
| Aqueous HF Treated Al$_2$O$_3$ | | | 96[f] | 1.2 | |
| Aqueous HF Treated Al$_2$O$_3$ | | | 90[d] | 3.25 | |
| Gaseous HF Treated Al$_2$O$_3$ | | | 94[f] | 10 | |
| Gaseous HF Treated Al$_2$O$_3$ | | | 86[f] | 22 | |
| Gaseous HF Treated Al$_2$O$_3$ | | | 70[f] | 63 | |
| Aqueous NH$_4$F Treated Al$_2$O$_3$ | | | 71.4[f] | 45 | |

[a]500 cc/min., 1.0 atm. total pressure.
[b]Nitrogen BET method.
[c]Commercial $\delta$-Al$_2$O$_3$.
[d]Minimum AlF$_3$ content established by x-ray diffraction measurements. Commercial sample of AlF$_3$.
[e]AlF$_3$ content determined by TGA measurements.
[f]Literature values

TABLE IIB

SURFACE AREA AND PORE VOLUME OF A SERIES OF HCF$_3$ FLUORINATED ALUMINAS

| Fluoriding Agent | % AlF$_3$ | Surface Area (m$^2$/gm) | Pore Volume (cc/gm) |
|---|---|---|---|
| HCF$_3$ | 0 | 178 | 0.513 |
| HCF$_3$ | 3.46 | 175 | |
| HCF$_3$ | 6.86 | 171 | |
| HCF$_3$ | 13.3 | 165 | 0.526 |
| HCF$_3$ | 25.4 | 146 | 0.479 |
| HCF$_3$ | 36.2 | 135 | |
| HCF$_3$ | 46.1 | 95.7 | |
| HCF$_3$ | 63.5 | 79.0 | |
| HCF$_3$ | 78.2 | 47.1 | |
| HCF$_3$ | 90 | 49.7 | 0.232 |
| HCF$_3$ | 95 | 22.4 | 0.171 |
| HCF$_3$ | 100 | 8.88 | 0.050 |
| Aqueous NH$_4$F[a] | 24.6 | 51 | |
| Aqueous NH$_4$F[a] | 58.5 | 43 | |
| Gaseous HF[a] | 94 | 10 | |
| Aqueous HF[a] | 96 | 1.2 | |
| Aqueous HF[b] | 95 | 3.25 | |

[a]Literature values.
[b]Commercial AlF$_3$ sample.

The CHF$_3$ prepared AlF$_3$-Al$_2$O$_3$ samples generally exhibit higher surface areas than those prepared by fluoriding Al$_2$O$_3$ with either HF or NH$_4$F. This is espe-

TABLE III

MAJOR X-RAY DIFFRACTION LINES OF ALUMINUM FLUORIDE[a]

| d, Å[b] | I[b] | d, Å[c] |
|---|---|---|
| 3.52 | 100 | 3.55 |
| 2.119 | 19 | 2.12 |
| 1.759 | 24 | 1.765 |
| 1.587 | 14 | 1.585 |

TABLE III-continued

MAJOR X-RAY DIFFRACTION LINES OF ALUMINUM FLUORIDE[a]

| d, Å[b] | I[b] | d, Å[c] |
|---|---|---|
| 1.560 | 7 | 1.566 |

[a]Rhombohedral AlF$_3$.
[b]Literature values.
[c]Found for CHF$_3$ prepared AlF$_3$.

Pore Volume

The pore volumes of the HCF$_3$ prepared AlF$_3$ samples were found to decrease with decreasing surface area (see Tables IIA and IIB). Since the H$_2$O wettabilities of these samples were all found to be near 0.3 cc/gm, a large fraction of the total adsorptive capacity must be associated with macropores (pore diameters greater than 1200 Å). The average pore diameter within the 1200 Å and less range was found to be between 80–100 Å. This situation can be contrasted with a typical γ-Al$_2$O$_3$ in which at least 95% of the total pore volume is associated with pores having diameters less than 1200 Å. The average pore diameter of the starting 178 m$^2$/gm γ-Al$_2$O$_3$ is near 70–75 Å.

The physical form and surface characteristics of HCF$_3$ prepared AlF$_3$ suggests potential application as a catalyst support. The self-supporting extrudate form would allow usage in a fixed-bed operation. An active metal component supported on AlF$_3$ would reside primarily on the surface since the pore volume is mainly composed of pores with diameters greater than 1200 Å. The latter situation may be desirable in catalytic operations where pore blockage and/or diffusion limitations may be present.

Acidity

Acidity measurements were performed by titration of solid AlF$_3$ catalysts with standardized n-butylamine/benzene solutions at room temperature using a series of Hammett Indicators. The results of these studies are summarized in Table IV. An anthraquinone indicator ($H_o \leq -8.2$) was not converted by any of the 90% and higher AlF$_3$ catalysts into its acid form. Thus, none of these materials contain acid sites equivalent to 90% H$_2$SO$_4$. AlF$_3$-Al$_2$O$_3$ catalysts containing relatively small quantities of AlF$_3$, 3.3 and 24.6%, respectively, have been reported in the literature to possess $H_o \leq -5.6$ (equivalent to 71% H$_2$SO$_4$) acid sites. These acidic sites disappear, however, at higher AlF$_3$ concentrations. At still higher AlF$_3$ concentration studies reported in the literature only $H_o \leq -3.0$ (equivalent to 48% H$_2$SO$_4$) acid sites were found. The higher number of acidic sites exhibited by the lower wt. % AlF$_3$ catalysts reported in the literature may be associated with an unreacted Al$_2$O$_3$ component. AlF$_3$ catalysts containing greater than 90 wt. % AlF$_3$ (prepared by either aqueous or gaseous HF treatment of Al$_2$O$_3$) have been reported to be devoid of acid sites equivalent to 48% H$_2$SO$_4$. The 25–100% AlF$_3$ catalysts prepared in this study using CHF$_3$ are considerably more acidic than the literature AlF$_3$ and AlF$_3$-Al$_2$O$_3$ catalysts listed in Table IV. The differences in acidity between these various AlF$_3$ preparations is especially apparent when compared on a m$^2$ basis. The retention of acidity in the HCF$_3$ prepared AlF$_3$ catalysts would not be predicted from the results reported in the literature.

The Hammett acidity profile of γ-Al$_2$O$_3$ is included in Table IV for comparative purposes. It is apparent that CHF$_3$ prepared AlF$_3$ and partially fluorinated Al$_2$O$_3$ retain much higher acidities than conventionally fluorinated Al$_2$O$_3$. Thus, HCF$_3$ prepared AlF$_3$ extrudates and aluminum oxyfluorides of the instant invention would be predicted to be much better solid acid catalysts than materials of the same fluorine content prepared by conventional fluoriding procedures. The acidity advantage predicted for HCF$_3$ prepared fluorided aluminas, when compared to aluminas fluorided with aqueous HF is clearly demonstrated in FIG. 1 where cyclohexene isomerization activities are compared. The differences in isomerization activity are especially apparent at higher fluorine levels where the HCF$_3$ fluorinated aluminas are markedly superior catalysts.

TABLE IV

ACIDITIES OF A SERIES OF HCF$_3$ FLUORINATED ALUMINAS

| % AlF$_3$ | Acidity (± 25μmole/gm) pKa | | | Acidity (μmoles/m$^2$) |
|---|---|---|---|---|
|  | $\leq -8.2$[a] | $\leq -5.6$[b] | $\leq -3.0$[c] |  |
| 0 | 325 | 325 | 475 | 2.7 |
| 3.46 | 325 | 375 | 375 | 2.1 |
| 6.86 | 300 | 375 | 375 | 2.2 |
| 13.3 | 275 | 325 | 325 | 2.0 |
| 25.4 | 275 | 325 | 325 | 2.2 |
| 46.1 | 175 | 225 | 225 | 2.4 |
| 63.5 | 125 | 175 | 175 | 2.2 |
| 78.2 | 75 | 125 | 125 | 2.7 |
| 95 | 0 | 0 | 66 ± 12 | 2.8 |
| 90 | 0 | 0 | 140 ± 12 | 2.8 |
| 100 | 0 | 25 | 25 | 2.8 |
| 3.3[d] | 0 | 140 | 300 | 3.1 |
| 24.6[d] | 0 | 90 | 160 | 3.1 |
| 58.5[d] | 0 | 0 | 60 | 1.4 |
| 71.4[d] | 0 | 0 | 30 | 0.7 |
| 90[e] | 0 | 0 | 0 | 0 |
| 94[f] | 0 | 0 | 0 | 0 |

[a]Anthraquinone indicator (acidic form requires 90% H$_2$SO$_4$).
[b]Benzolacetophenone indicator (acidic form requires 71% H$_2$SO$_4$).
[c]Dicinnamalacetone indicator (acidic form requires 48% H$_2$SO$_4$).
[d]NH$_4$F treated Al$_2$O$_3$ (literature technique).
[e]Aqueous HF treated Al$_2$O$_3$ (literature technique).
[f]Aqueous HF treated Al$_2$O$_3$ (literature technique).

Fluoridation of MgO

Dry MgO (187 m$^2$/gm) samples were reduced under 20% H$_2$/He (500 cc/min) at 500° C. for 1.0 hr and then purged with He (500 cc/min) at 500° C. for 0.5 hr. The pretreated MgO samples were then treated with HCF$_3$ as follows (see Table V):

TABLE V

HCF$_3$ FLUORIDATION OF MgO

| | MgO (gm) | HCF$_3$ (cc/min) | He (cc/min) | T (°C.) | t (min) | Product Wt (gm) | | MgF$_2$ (%) | BET (m$^2$/gm) |
|---|---|---|---|---|---|---|---|---|---|
| | | | | | | (Theo) | (found) | | |
| A | 5.0 | 49.7 | 199 | 500 | 60 | 7.7 | 7.4 | 100 | 12 |
| B | 5.0 | 49.9 | 200 | 450 | 60 | 7.7 | 7.2 | 100 | 19 |
| C | 5.0 | 49.6 | 200 | 500 | 15 | 6.0 | 5.8 | 51 | 90 |
| D | 5.0 | 49.7 | 200 | 500 | 7.5 | 5.5 | 5.3 | 28 | 114 |

TABLE V-continued
HCF₃ FLUORIDATION OF MgO

| | MgO (gm) | HCF₃ (cc/min) | He (cc/min) | T (°C.) | t (min) | Product Wt (gm) (Theo) | Product Wt (gm) (found) | MgF₂ (%) | BET (m²/gm) |
|---|---|---|---|---|---|---|---|---|---|
| E | 5.0 | 24.9 | 200 | 500 | 7.5 | 5.3 | 5.2 | 15 | 130 |

The results summarized in the Table V clearly shows that the reaction of MgO with HCF₃ producing MgF₂ is essentially quantitative. The essentially fully fluorinated samples (A) and (B) exhibit x-ray diffraction lines of MgF₂ only, no unreacted MgO was detected. Samples (A) and (B) possess relatively high BET surface areas as commercially available MgF₂ samples display BET surface areas of less than 5.0 m²/gm. MgF₂ because of its high thermal stability, chemical inertness and high intrinsic acidity is useful in a wide variety of hydrocarbon conversion reactions which are catalyzed by acidic solids. Such conversions would include catalytic cracking, and hydrocarbon isomerizations. MgF₂ as well as partially fluorinated MgO (samples C-E) are useful as supports for Group VIII-metal catalysts. Such catalysts possessing both metal and acidic functions are useful in a wide variety of hydrocarbon conversion reactions. Examples of such conversions would include naphtha reforming, hydrocracking, xylene isomerization, olefin and aromatic hydrogenation, etc.

Fluoridation of TiO₂

Dry TiO₂ is readily fluorinated to TiOF₂ using HCF₃. The following example serves to illustrate the transformation: 1.0 gm of dry TiO₂ was treated with 20% HCF₃/He (250 cc/min) at 550° C. for 1.0 hr. The crude reaction product was analyzed by x-ray diffraction and was found to contain 45-50% TiOF₂.

Fluoridation of Ta₂O₅

Dry Ta₂O₅ is readily fluorinated by TaO₂F using HCF₃. The following example serves to illustrate the transformation: 3.0 gm of Ta₂O₅ was allowed to react with 20% HCF₃/He (250 cc/min) at 550° C. for 2.0 hrs. The crude product was analyzed by x-ray diffraction and was found to contain 50-60% TaO₂F.

Fluoridation of UO₂

HCF₃ has been found to smoothly convert UO₂ to UF₄ within the temperature range 350°-700° C. The rate of fluoridation in a given time period increasing with increasing temperature. The following example serves to illustrate the process. A 100 mg sample of UO₂ was reduced under 20% H₂/He (500 cc/min) at 700° C. for 2.0 hours and then treated with 50 cc HCF₃/min. at 410° C. for 1.0 hour. An x-ray diffraction pattern of the crude product indicated 20-30% conversion of UO₂ into UF₄. The direct fluoridation of UO₂ demonstrated above finds utility in the separation of uranium from crude oxide ores.

Fluoridation of Mixed-Metal Oxides

Mixed-metal oxides such as TiO₂/Al₂O₃, TiO₂/SiO₂, Ta₂O₅/Al₂O₃, Ta₂O₅/SiO₂, Nb₂O₅/Al₂O₃, TiO₂/Ta₂O₅, TiO₂/Nb₂O₅, MgO/Al₂O₃, MgO/SiO₂, SiO₂/Al₂O₃, NiO₃/Al₂O₃, NiO₃/SiO₂ and ZrO₂/Al₂O₃ which are readily prepared by conventional coprecipitation techniques are readily fluorinated with HCF₃. As an example consider the following: 5.0 gm of a dry 12% Ta₂O₅/Al₂O₃ mixed-metal oxide was reduced at 500° C. using 20% H₂/He (500 cc/min) and then allowed to react with 20% HCF₃/He (250 cc/min) at 500° C. for 15 mins. The product incorporated a substantial quantity of fluorine as the product was found to weigh 5.9 gms. The crude product displayed x-ray diffraction lines due to AlF₃ and TaO₂F phases as well as unreacted Al₂O₃ and Ta₂O₅. Other mixed-metal oxides behave similarly. Because of their high acidity partially fluorinated mixed-metal oxides are useful in acid catalyzed hydrocarbon conversion reactions such as catalytic cracking and isomerization. Partially fluorinated mixed-metal oxides also have utility as supports for Group VIII-metal catalysts which are useful in a wide variety of hydrocarbon conversion reactions such as naphtha reforming, olefin and aromatic hydrogenation, paraffin isomerization, xylene isomerization, hydrocracking, etc.

Special Fluoridation of Al₂O₃ With HCF₃

It has been stated in GB 969863 that freons are ineffective fluoriding agents in the presence of a reducing atmosphere such as H₂. We have shown that Al₂O₃ is readily fluorinated with HCF₃ in the presence of H₂. Consider the following example.

| Al₂O₃ (gm) | HCF₃ (cc/min) | H₂ (cc/min) | T (°C.) | t (min) | Product wt (gm) theo | Product wt (gm) found | AlF₃ (%) | BET (m²/gm) |
|---|---|---|---|---|---|---|---|---|
| 20.0 | 50 | 200 | 500 | 180 | 32.9 | 31.0 | 100 | 12 |

An x-ray diffraction pattern of the product was devoid of any Al₂O₃ lines. Thus essentially complete fluoridation has been affected in the presence of hydrogen.

What is claimed is:

1. A process for the preparation of high surface area metal fluorides comprising reacting a metal oxide selected from the group consisting of the oxides of sodium, potassium, lithium, cesium, magnesium, calcium, barium, strontium, tin, antimony, bismuth, titanium, zirconium, vanadium, chromium, manganese, iron, cobalt, rhodium, mercury, nickel, copper, silver, zinc, cadmium, lead, uranium, europium, indium, lutetium, neodymium, thallium and mixtures thereof with a fluorocarbon selected from the group consisting of CH₄₋$_Q$F$_Q$ wherein Q is 1 to 3 and partially and totally fluoridated C₂-C₆ alkanes, alkenes, alkynes and C₅-C₆ cyclic alkanes wherein the metal oxide and the fluorocarbon are contacted at a temperature of from 300° to 800° C.

at a fluorocarbon partial pressure of from 0.001 to 100 atmospheres, for a time sufficient to effect the substantially complete conversion of the metal oxide into metal fluoride.

2. The process of claim 1 wherein the fluorocarbon is selected from the group consisting of $CH_{4-Q}F_Q$ wherein Q is 1 to 3 and straight and branch chain $C_2$–$C_6$ fluorocarbons of the general formula $$C_A H_{2A+2-B} F_B$$

wherein A is an integer ranging from 2-6 inclusive and B is an integer ranging from 1-14, and cyclic fluorocarbon of the formula $$C_X H_{2X-C} F_C$$

wherein X is 5 or 6 and C is an integer ranging from 1 to 12 inclusive.

3. The process of claim 1 wherein the metal oxide is selected from the group consisting of the oxides of titanium, magnesium, uranium, nickel, cobalt and zirconium.

4. The process of claim 1 wherein the metal oxide is the oxides of titanium.

5. The process of claim 2 wherein A ranges from 2 to 3.

6. The process of claim 1 wherein the fluorocarbon is trifluoromethane.

7. The process of claim 1 further comprising the use of alumina in combination with the enumerated metal oxides.

8. The process of claim 1 wherein the temperature ranges from 300° to 600° C.

9. The process of claim 1 wherein the temperature ranges from 350° to 550° C.

10. The process of claim 1 wherein the fluorocarbon partial pressure ranges from 0.1 to 1.0 atmospheres.

11. A process for the preparation of high surface area aluminum fluoride extrudates comprising reacting a high surface area alumina extrudate with a fluorocarbon selected from the group consisting of $CH_{4-Q}F_Q$ wherein Q is 1–3 and partially and totally fluoridated $C_2$–$C_6$ alkanes, alkenes, alkynes and $C_5$–$C_6$ cyclic alkane wherein the alumina extrudate and the fluorocarbon are contacted at a temperature of from 300° to 800° C. at a fluorocarbon pressure ranging from 0.001 to 100 atm for a time sufficient to affect the essentially complete conversion of the alumina to an aluminum fluoride extrudate.

12. The process of claim 11 wherein the fluorocarbon is selected from the group consisting of $CH_{4-y}F_y$ wherein y is 1–3 and straight and branch chain $C_2$–$C_6$ fluorocarbons of the general formulae $$C_A H_{2A+2-B} F_B$$

wherein A is an integer ranging from 2-6 inclusive and B is an integer ranging from 1-14, the cyclic fluorocarbons of the formula $$C_X H_{2X-C} F_C$$

wherein X is 5 or 6 and C is an integer ranging from 1 to 12 inclusive.

13. The process of claim 11 wherein the fluorocarbon is trifluoromethane.

14. The process of claim 11 wherein the temperature is from 300° to 600° C.

15. The process of claim 11 wherein the fluorocarbon partial pressure ranges from 0.1 to 1.0 atmospheres.

16. The process of claim 11 wherein the conversion of alumina to aluminum fluoride is greater than 90%.

17. The process of claim 11 wherein the aluminum fluoride extrudate has a surface area of from 10 to over 50 m²/gm.

18. High surface area aluminum fluoride extrudates prepared by reacting a high surface area alumina extrudate with a fluorocarbon selected from the group consisting of $CH_{4-Q}F_Q$ wherein Q is 1 to 3 and partially and totally fluoridated $C_2$–$C_6$ alkanes, alkenes, alkynes and $C_5$–$C_6$ cyclic alkanes wherein the alumina extrudate and the fluorocarbon are contacted at a temperature of from about 300° to about 800° C. at a fluorocarbon partial pressure of from about 0.001 to about 1 atmosphere for a time sufficient to effect the substantially complete conversion of the alumina extrudate into the aluminum fluoride extrudate.

19. The high surface area aluminum fluoride extrudates prepared as in claim 18 wherein the fluorocarbon is selected from the group consisting of fluoroform, straight and branch chain $C_2$–$C_6$ fluorocarbons of the general formula $$C_A H_{2A+2-B} F_B$$

wherein A is an integer ranging from 2 to 6 inclusive and B is an integer ranging from 1 to 14 and cyclic fluorocarbons of the formula $$C_X H_{2X-C} F_C$$

wherein X is 5 or 6 and C is an integer ranging from 1 to 12.

20. The aluminum fluoride extrudates of claim 19 wherein A ranges from 2 to 3.

21. The aluminum fluoride extrudates of claim 18 wherein the fluorocarbon is fluoroform.

22. The aluminum fluoride extrudates of claim 18 wherein the temperature ranges from about 300° to about 600° C.

23. The aluminum fluoride extrudates of claim 18 wherein the fluorocarbon partial pressure ranges from about 0.1 to about 1 atmosphere.

24. High surface area mixed metal-aluminum fluorides prepared by reacting a metal oxide selected from the group consisting of the oxides of sodium, potassium, lithium, cesium, magnesium, calcium, barium, strontium, tin, antimony, bismuth, titanium, zirconium, vandium, chromium, manganese, iron, cobalt, rhodium, mercury, nickel, copper silver, zinc, cadmium, lead, uranium, europium, indium, lutetium, neodymium and thallium in combination with alumina with a fluorocarbon selected from the group consisting of $CH_{4-Q}F_Q$ wherein Q is 1 to 3 and partially and totally fluoridated $C_2$–$C_6$ alkanes, alkenes, alkynes and $C_5$–$C_6$ cyclic alkanes wherein the metal oxide and the fluorocarbon are contacted at a temperature of from about 300° to about 800° C. at a fluorocarbon partial pressure of from about 0.001 to about 1 atmosphere for a time sufficient to effect the substantially complete conversion of the mixed metal-aluminum oxide into the mixed metal-aluminum fluoride.

25. The high surface area mixed metal-aluminum fluorides prepared as in claim 24 wherein the fluorocarbon is selected from the group consisting of fluoroform, straight and branch chain $C_2$–$C_6$ fluorocarbons of the general formula $$C_AH_{2A+2-B}F_B$$

wherein A is an integer ranging from 2 to 6 inclusive and B is an integer ranging from 1 to 14 cyclic fluorocarbons of the formula $$C_XH_{2X-C}F_C$$

wherein X is 5 or 6 and C is an integer ranging from 1 to 12.

* * * * *